(12) United States Patent
Bhooma

(10) Patent No.: US 9,112,698 B1
(45) Date of Patent: *Aug. 18, 2015

(54) CRYPTOGRAPHIC DEVICE AND METHOD FOR DATA ENCRYPTION WITH PER-ROUND COMBINED OPERATIONS

(71) Applicant: Marvell International Ltd., Hamilton (BM)

(72) Inventor: Pranab Bhooma, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,066

(22) Filed: Oct. 22, 2013

Related U.S. Application Data

(63) Continuation of application No. 12/551,638, filed on Sep. 1, 2009, now Pat. No. 8,565,421.

(60) Provisional application No. 61/144,946, filed on Jan. 15, 2009.

(51) Int. Cl.
*H04K 1/00* (2006.01)
*H04L 9/00* (2006.01)
*H04L 9/28* (2006.01)

(52) U.S. Cl.
CPC ..................................... *H04L 9/28* (2013.01)

(58) Field of Classification Search
USPC ................................................ 380/28, 29, 42
See application file for complete search history.

(56) References Cited

U.S. PATENT DOCUMENTS

| | | | |
|---|---|---|---|
| 6,259,789 B1 | 7/2001 | Paone | |
| 7,158,638 B2 | 1/2007 | Okada et al. | |
| 7,295,671 B2 | 11/2007 | Snell | |
| 8,085,934 B1 | 12/2011 | Bhooma | |
| 8,155,308 B1 | 4/2012 | Poo et al. | |
| 8,565,421 B1 * | 10/2013 | Bhooma | 380/29 |
| 2003/0059054 A1 | 3/2003 | Hu et al. | |
| 2003/0072444 A1 | 4/2003 | Hu et al. | |
| 2003/0223580 A1 | 12/2003 | Snell | |
| 2005/0213756 A1 | 9/2005 | Hubert | |
| 2008/0019504 A1 | 1/2008 | Han et al. | |

OTHER PUBLICATIONS

Advanced Encryption Standard (AES); Federal Information Processing Standards Publication 197; Nov. 26, 2001; 51 pages.

\* cited by examiner

*Primary Examiner* — William Powers
*Assistant Examiner* — Aubrey Wyszynski

(57) ABSTRACT

A cryptographic device includes a key addition module, a first module, and a key module. The key addition module generates an input block based on a cipher key and a plaintext block. The first module generates an output block by performing a plurality of rounds of processing on the input block. The key module, for each of the rounds, provides a round key based on the cipher key. The first module includes an inversion module that, for each of the rounds, performs a matrix inversion operation on first intermediate data to generate second intermediate data. In a first round of the rounds, the first intermediate data is set equal to the input block. The first module also includes a combined operation module that, for each of the rounds, updates the first intermediate data by performing an affine transformation operation and a mix columns operation on the second intermediate data.

23 Claims, 17 Drawing Sheets

CRYPTOGRAPHIC DEVICE AND METHOD FOR DATA ENCRYPTION WITH PER-ROUND COMBINED OPERATIONS

CROSS-REFERENCE TO RELATED APPLICATIONS

This is a continuation of U.S. patent application Ser. No. 12/551,638 (now U.S. Pat. No. 8,565,421), filed on Sep. 1, 2009, which claims the benefit of U.S. Provisional Patent Application Ser. No. 61/144,946, filed on Jan. 15, 2009. The entire disclosures of the applications referenced above are incorporated herein by reference.

BACKGROUND

The subject matter of the present disclosure relates generally to cryptography. More particularly, the present disclosure relates to improvements in block cipher techniques.

In block cipher systems such as the Advanced Encryption System (AES), encryption of plaintext into ciphertext proceeds in several iterations, referred to as "rounds." Each round employs one of several cryptographic keys, referred to as "round keys," that result from key expansion of a shared cryptographic key referred to as a "cipher key." AES specifies three different key lengths, each using a different number of rounds and round keys, as shown in Table 1. Referring to Table 1, while the size Nb of the plaintext block is always four 32-bit words, the key length Nk and number of rounds Nr can vary, as can the number of round keys Nr+1, which includes the cipher key and a round key for each of the Nr rounds.

TABLE 1

|         | Key Length (Nk words) | Block Size (Nb words) | Number of Rounds (Nr) |
|---------|-----------------------|-----------------------|-----------------------|
| AES-128 | 4                     | 4                     | 10                    |
| AES-192 | 6                     | 4                     | 12                    |
| AES-256 | 8                     | 4                     | 14                    |

While AES specifies the number of rounds for encryption or decryption as Nr, conventional implementations generally require Nr+1 cycles or more, primarily due to the fact that the total number of round keys is Nr+1, therefore requiring Nr+1 key addition operations. FIG. 1 shows a conventional AES encryption implementation 100.

Referring to FIG. 1, implementation 100 includes a key module 102 and a cipher module 104. Cipher module 104 is implemented in two sections 106 and 108. Section 106 includes a key addition module 110A, a SubBytes module 112A, a ShiftRow module 114A, and a MixColumn module 116A. Section 108 includes two further key addition modules 110B and 110C, a further SubBytes module 112B, and a further ShiftRow module 114B. Each of these modules is defined by the AES standard. Key module 102 is also implemented in two sections 118 and 120.

Sections 106 and 118 perform rounds 1 through Nr−1 of encryption, while sections 108 and 120 perform encryption for the final round Nr. Furthermore, the key addition modules 110B and 110C in section 108 are generally implemented in two respective cycles, resulting in Nr+1 total cycles of operation for cipher module 104. Note especially the redundant modules in implementation 100, which are conventionally implemented as redundant circuits, resulting in inefficiencies such as increased integrated circuit die area, power consumption, and the like.

SUMMARY

In general, in one aspect, an embodiment features an apparatus comprising: an encryption module configured to generate a ciphertext block based on a cipher key and an input block, wherein the encryption module comprises a key module configured to provide Nr round keys based on the cipher key, and a cipher module configured to perform Nr cycles of encryption based on the input block and the Nr round keys; and a first key addition module configured to generate the input block based on the cipher key and the plaintext block, wherein the first key addition module is external to the encryption module.

In general, in one aspect, an embodiment features an apparatus comprising: a decryption module configured to generate a plaintext block based on a cipher key and an input block, wherein the decryption module comprises a key module configured to provide Nr round keys based on the cipher key, and a cipher module configured to perform Nr cycles of decryption based on the input block and the Nr round keys; and a first key addition module configured to generate the input block based on the cipher key and the ciphertext block, wherein the first key addition module is external to the decryption module.

The details of one or more implementations are set forth in the accompanying drawings and the description below. Other features will be apparent from the description and drawings, and from the claims.

Figure 1:
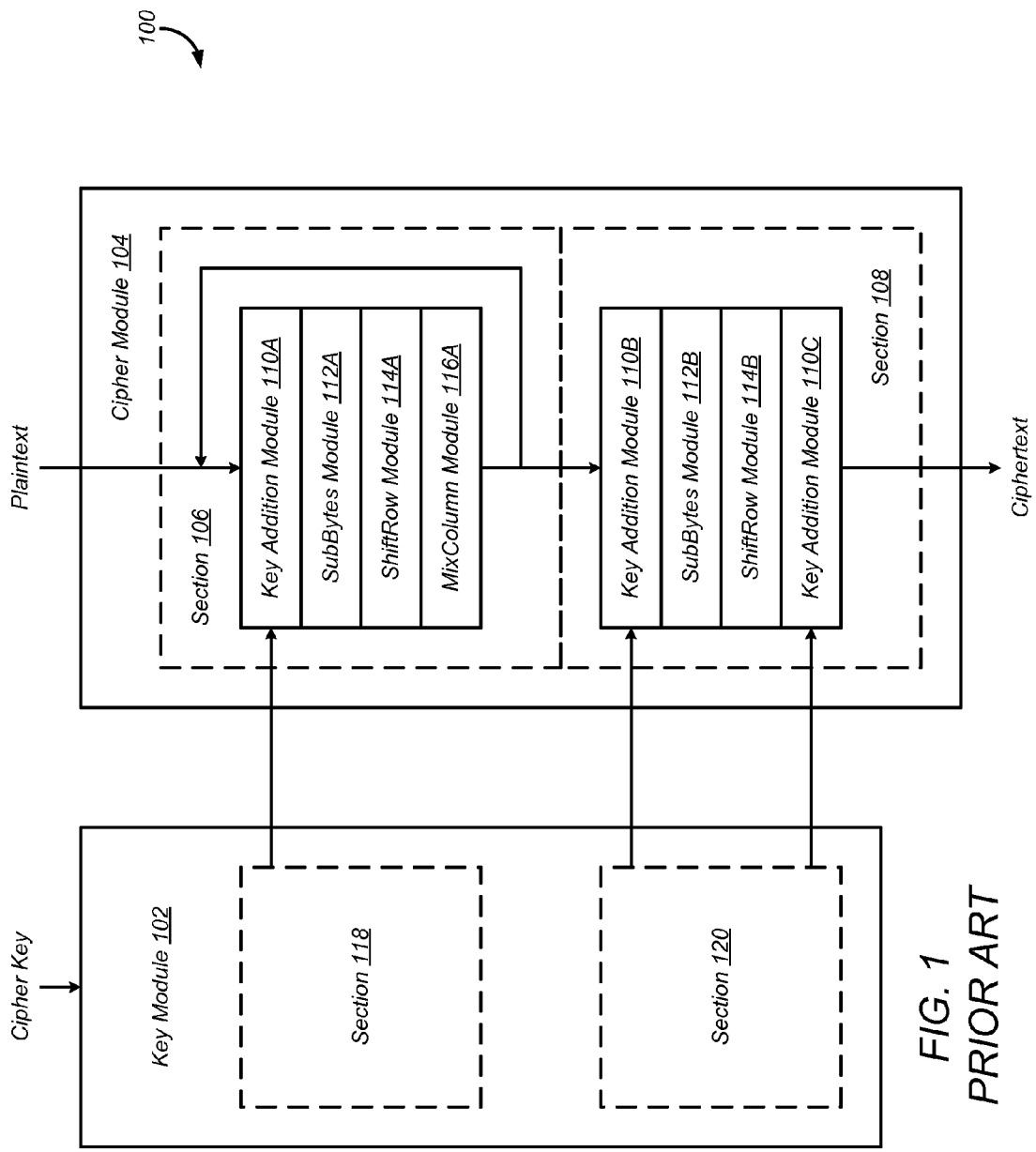
FIG. 1 shows a conventional AES encryption implementation.

The leading digit(s) of each reference numeral used in this specification indicates the number of the drawing in which the reference numeral first appears.

DETAILED DESCRIPTION

The subject matter of the present disclosure relates to improvements in block cipher techniques such as those specified by the Advanced Encryption System (AES) standard. However, while described with reference to the AES standard, various embodiments can be employed with other types of block ciphers. According to various embodiments, encryption or decryption can proceed in Nr cycles or fewer, as described in detail below.

According to some embodiments, the initial key addition is performed outside the encryption (or decryption) module. Therefore only Nr key additions are required to be performed inside the encryption (or decryption) module. This technique allows the encryption (or decryption) module to complete its operation in Nr cycles, rather than the conventional Nr+1 cycles.

Figure 2:
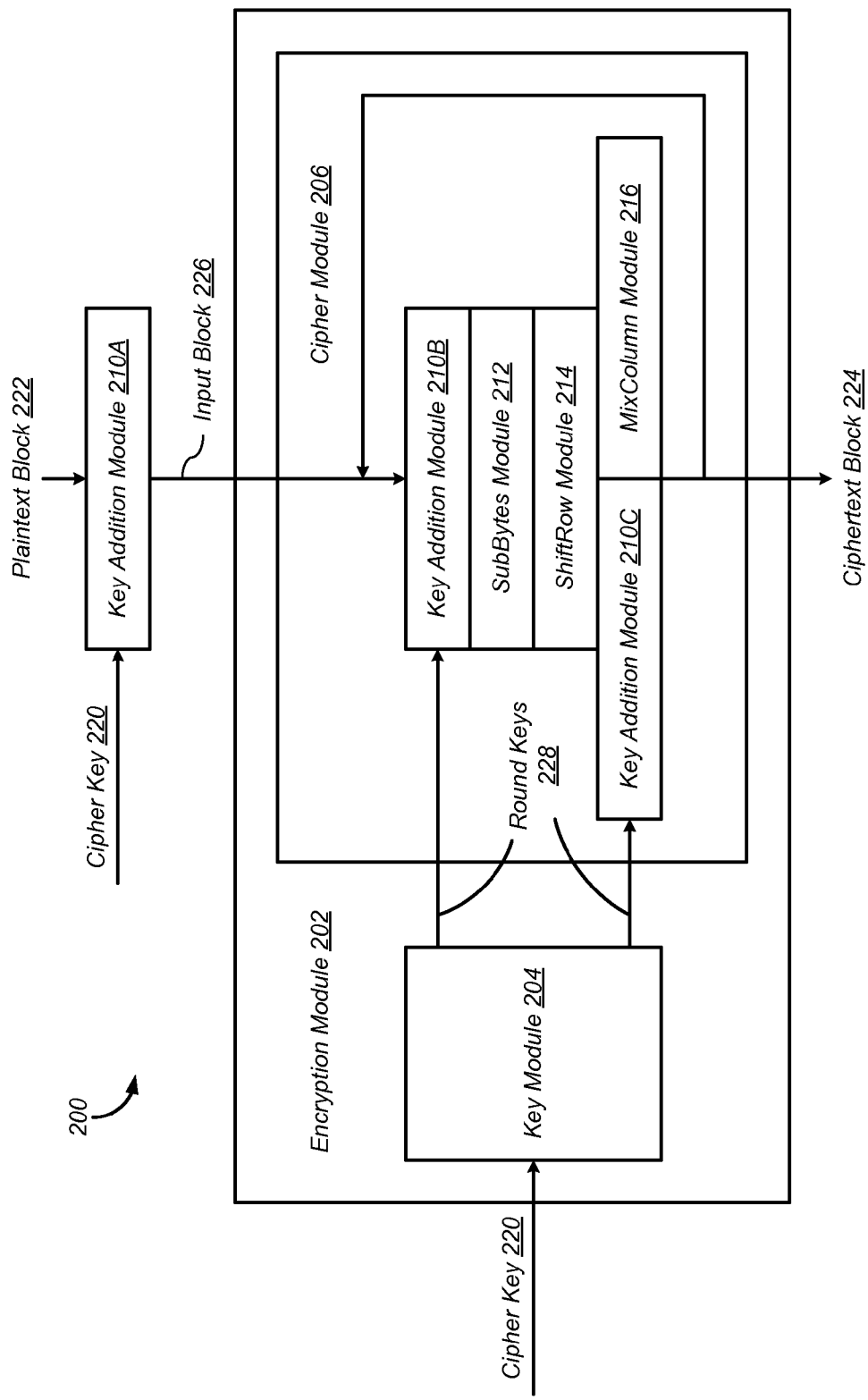
FIG. 2 shows an encryption implementation for encryption in Nr rounds according to some embodiments.

FIG. 2 shows an encryption implementation 200 for encryption in Nr rounds according to some embodiments. Although in the described embodiments, the elements of encryption implementation 200 are presented in one arrangement, other embodiments may feature other arrangements. For example, the elements of encryption implementation 200 can be implemented in hardware, software, or combinations thereof. In some embodiments, encryption implementation 200 is in compliance with the Advanced Encryption System (AES) Standard.

Referring to FIG. 2, implementation 200 includes an encryption module 202 and a key addition module 210A. Encryption module 202 includes a key module 204 and a cipher module 206. Cipher module 206 includes two key addition modules 210B and 210C, a byte substitution (SubBytes) module 212, a row shift (ShiftRow) module 214, and a mix column (MixColumn) module 216. Each of these modules can be implemented according to the AES standard.

Note that key addition module 210A is external to cipher module 206. Key addition module 210A can be implemented externally because the required inputs, namely cipher key 220 and plaintext block 222, are available at the beginning of the encryption process.

Within cipher module 206, encryption proceeds in Nr cycles. Key addition module 210B is bypassed in the first round, but is used in each subsequent round. Mix columns module 216 is used in all but the last round. Key addition module 210C is used only in the last round, where it produces ciphertext block 224. This sequence of operations is illustrated by FIG. 3, described below.

Figure 3:
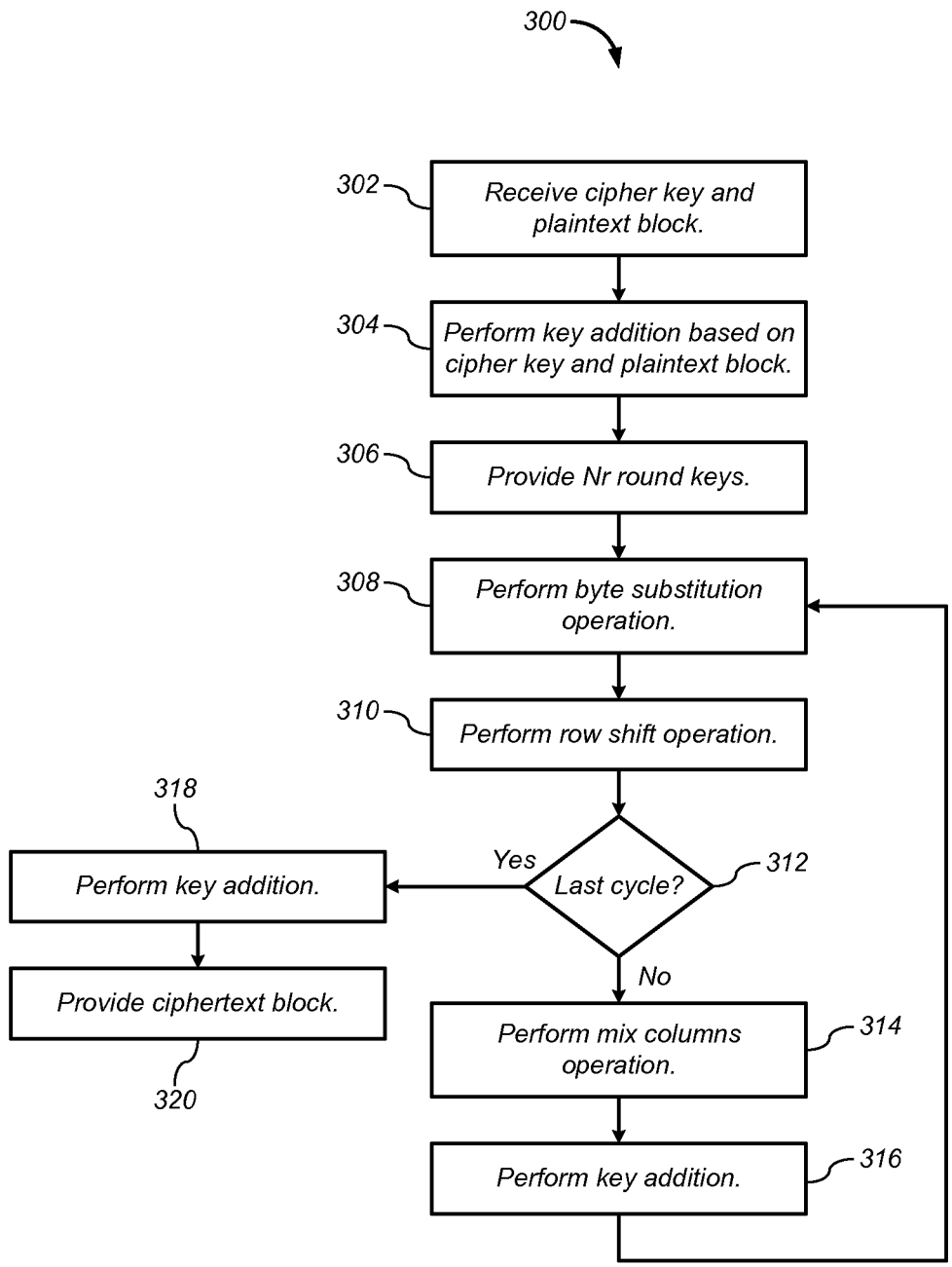
FIG. 3 shows a flowchart of an encryption process for the encryption implementation of FIG. 2 according to some embodiments.

FIG. 3 shows a flowchart of an encryption process 300 for encryption implementation 200 of FIG. 2 according to some embodiments. Although in the described embodiments, the elements of process 300 are presented in one arrangement, other embodiments may feature other arrangements. For example, in various embodiments, some or all of the steps of process 300 can be executed in a different order, concurrently, and the like. In some embodiments, process 300 is in compliance with the Advanced Encryption System (AES) Standard.

Referring to FIG. 3, implementation 200 receives cipher key 220 and plaintext block 222 (step 302). Key addition module 210A performs key addition based on cipher key 220 and plaintext block 222 (step 304). For example, the key addition can be an exclusive-OR operation. In AES implementations, the key addition can be as specified by the AES standard. The result of the key addition is shown in FIG. 2 as input block 226.

Next encryption module 202 generates ciphertext block 224 based on cipher key 220 and input block 226, for example according to the process described below. Key module 204 provides Nr round keys 228 (FIG. 2) based on cipher key 220 (step 306). Key module 204 can provide round keys 228 according to any technique. For example, key expansion can be used to generate round keys 228 based on cipher key 220. In AES embodiments, the key expansion can be as specified by the AES standard. Key module 204 can provide round keys 228 in parallel with the operations of cipher module 206.

Cipher module 206 performs Nr cycles of encryption based on input block 226 and round keys 228, for example according to the process described below. In each of cycles 2 through Nr−1 the encryption employs a respective round key 228. Cycle Nr of the encryption employs two respective round keys 228.

As mentioned above, in the first cycle key addition module 210B is bypassed, and so input block 226 is passed to SubBytes module 212, which generates a state based on input block 226 and a byte substitution operation (step 308). The term "state" as used herein refers to an intermediate cipher result that can be pictured as a rectangular array of bytes having four rows and Nb columns. In AES embodiments, the byte substitution operation can be as specified by the AES standard.

ShiftRow module 214 then generates a state based on the state generated by SubBytes module 212 and a row shift operation (step 310). In AES embodiments, the row shift operation can be as specified by the AES standard.

If the last cycle has not been reached (step 312), the state generated by ShiftRow module 214 is passed to MixColumn module 216, which generates a state based on the state generated by ShiftRow module 214 and a mix columns operation (step 314). In AES embodiments, the mix columns operation can be as specified by the AES standard. The state generated by MixColumn module 216 is then passed to key addition module 210B, which generates a state based on the respective round key 228 and the state generated by MixColumn module 216 (step 316). SubBytes module 212 then generates a state based on the state generated by key addition module 210B and the byte substitution operation (step 308).

Steps 308 through 316 repeat until the last cycle of encryption, cycle Nr, is reached (step 312). During the last cycle, the state generated by ShiftRow module 214 is passed to key addition module 210C, which generates ciphertext block 224 based on the final round key and the state generated by ShiftRow module 214 (step 318). Encryption module 202 then provides ciphertext block 224 (step 320).

Figure 4:
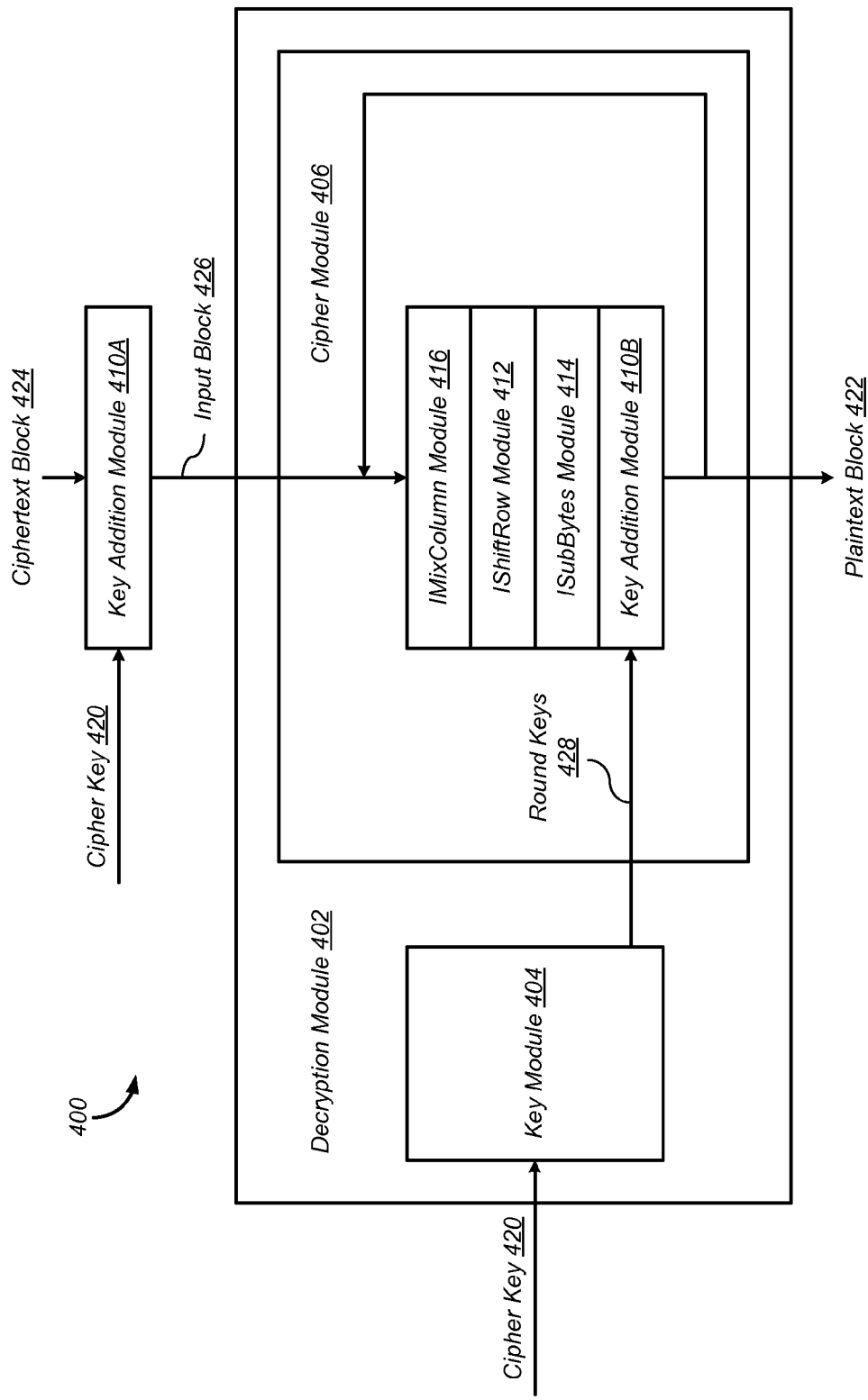
FIG. 4 shows a decryption implementation for decryption in Nr rounds according to some embodiments.

The techniques described above apply to decryption as well. FIG. 4 shows a decryption implementation 400 for decryption in Nr rounds according to some embodiments. Although in the described embodiments, the elements of decryption implementation 400 are presented in one arrangement, other embodiments may feature other arrangements. For example, the elements of decryption implementation 400 can be implemented in hardware, software, or combinations thereof. In some embodiments, decryption implementation 400 is in compliance with the Advanced Encryption System (AES) Standard.

Referring to FIG. 4, implementation 400 includes a decryption module 402 and a key addition module 410A. Decryption module 402 includes a key module 404 and a cipher module 406. Cipher module 406 includes a key addition module 410B, an inverse row shift module (IShiftRow) module 412, an inverse byte substitution (ISubBytes) module 414, and an inverse mix columns (IMixColumn) module 416. Each of these modules can be implemented according to the AES standard.

Note that key addition module 410A is external to cipher module 406. Key addition module 410A can be implemented externally because the required inputs, namely cipher key 420 and ciphertext block 424, are available at the beginning of the decryption process.

Within cipher module 406, decryption proceeds in Nr cycles. IMixColumn module 416 is bypassed in the first round, but is used in each subsequent round. This sequence of operations is illustrated by FIG. 5, described below.

Figure 5:
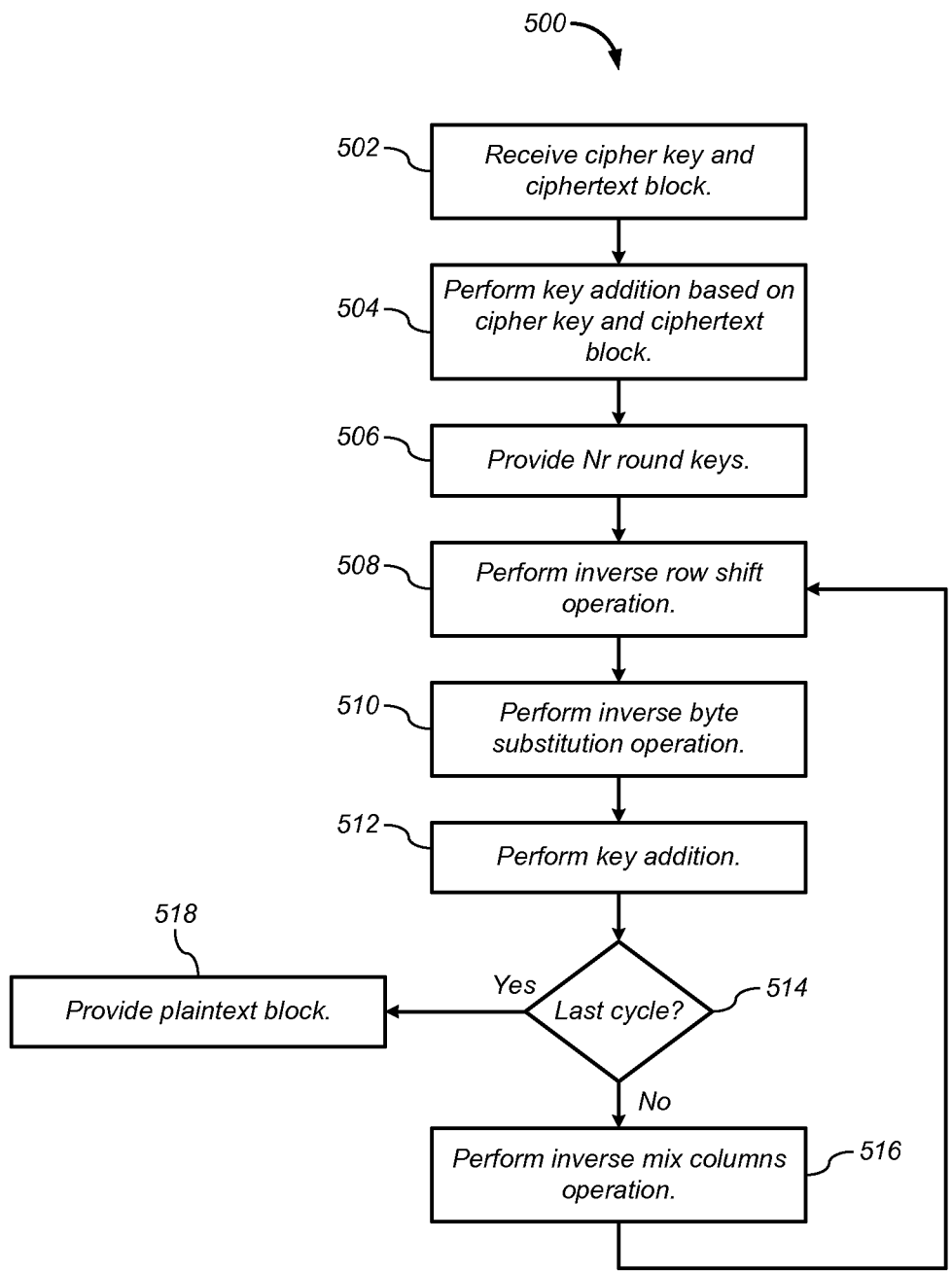
FIG. 5 shows a flowchart of a decryption process for the decryption implementation of FIG. 4 according to some embodiments.

FIG. 5 shows a flowchart of a decryption process 500 for decryption implementation 400 of FIG. 4 according to some embodiments. Although in the described embodiments, the elements of process 500 are presented in one arrangement, other embodiments may feature other arrangements. For example, in various embodiments, some or all of the steps of process 500 can be executed in a different order, concurrently, and the like. In some embodiments, process 500 is in compliance with the Advanced Encryption System (AES) Standard.

Referring to FIG. 5, implementation 400 receives cipher key 420 and ciphertext block 424 (step 502). Key addition module 410A performs key addition based on cipher key 420 and ciphertext block 424 (step 504). For example, the key addition can be an exclusive-OR operation. In AES implementations, the key addition can be as specified by the AES standard. The result of the key addition is shown in FIG. 4 as input block 426.

Next decryption module 402 generates plaintext block 422 based on cipher key 420 and input block 426, for example according to the process described below. Key module 404 provides Nr round keys 428 (FIG. 4) based on cipher key 420 (step 506). Key module 404 can provide round keys 428 according to any technique. For example, reverse key expansion can be used to generate round keys 428 based on cipher key 420, as described in U.S. patent application Ser. No. 12/169,044 filed Jul. 8, 2008, the disclosure thereof incorporated by reference herein in its entirety. Key module 404 can provide round keys 428 in parallel with the operations of cipher module 406.

Cipher module 406 performs Nr cycles of decryption based on input block 426 and round keys 428, for example according to the process described below. In each of the Nr cycles the decryption employs a respective round key 428.

As mentioned above, in the first cycle IMixColumn module 416 is bypassed, and so input block 426 is passed to IShiftRow module 412, which generates a state based on input block 426 and an inverse row shift operation (step 508). In AES embodiments, the inverse row shift operation can be as specified by the AES standard.

ISubBytes module 414 then generates a state based on the state generated by IShiftRow module 412 and an inverse byte substitution operation (step 510). In AES embodiments, the inverse byte substitution operation can be as specified by the AES standard.

Key addition module 410B then generates a state based on the respective round key 428 and the state generated by ISubBytes module 414 (step 512). In AES embodiments, the key addition can be as specified by the AES standard.

If the last cycle has not been reached (step 514), the state generated by key addition module 410B is passed to IMixColumn module 416, which generates a state based on the state generated by key addition module 410B and the inverse mix columns operation (step 516). The state generated by IMixColumn module 416 is then passed to IShiftRow module 412, which generates a state based on the state generated by IMixColumn module 416 and an inverse mix columns operation (step 508). In AES embodiments, the inverse mix columns operation can be as specified by the AES standard.

Steps 508 through 516 repeat until the last cycle of decryption, cycle Nr, is reached (step 514). During the last cycle, the state generated by key addition module 410B is plaintext block 422. Decryption module 402 provides plaintext block 422 (step 518).

In the above-described embodiments, the initial key addition is performed outside the encryption (or decryption) module, thereby allowing the encryption (or decryption) module to complete its operation in Nr cycles, rather than the conventional Nr+1 cycles. Performing the initial key addition outside the encryption (or decryption) module also allows further improvements, as described in detail below. For example, the modules within encryption (or decryption) module can be reshuffled. That is, the cycles in which the modules operate can be changed.

Figure 6:
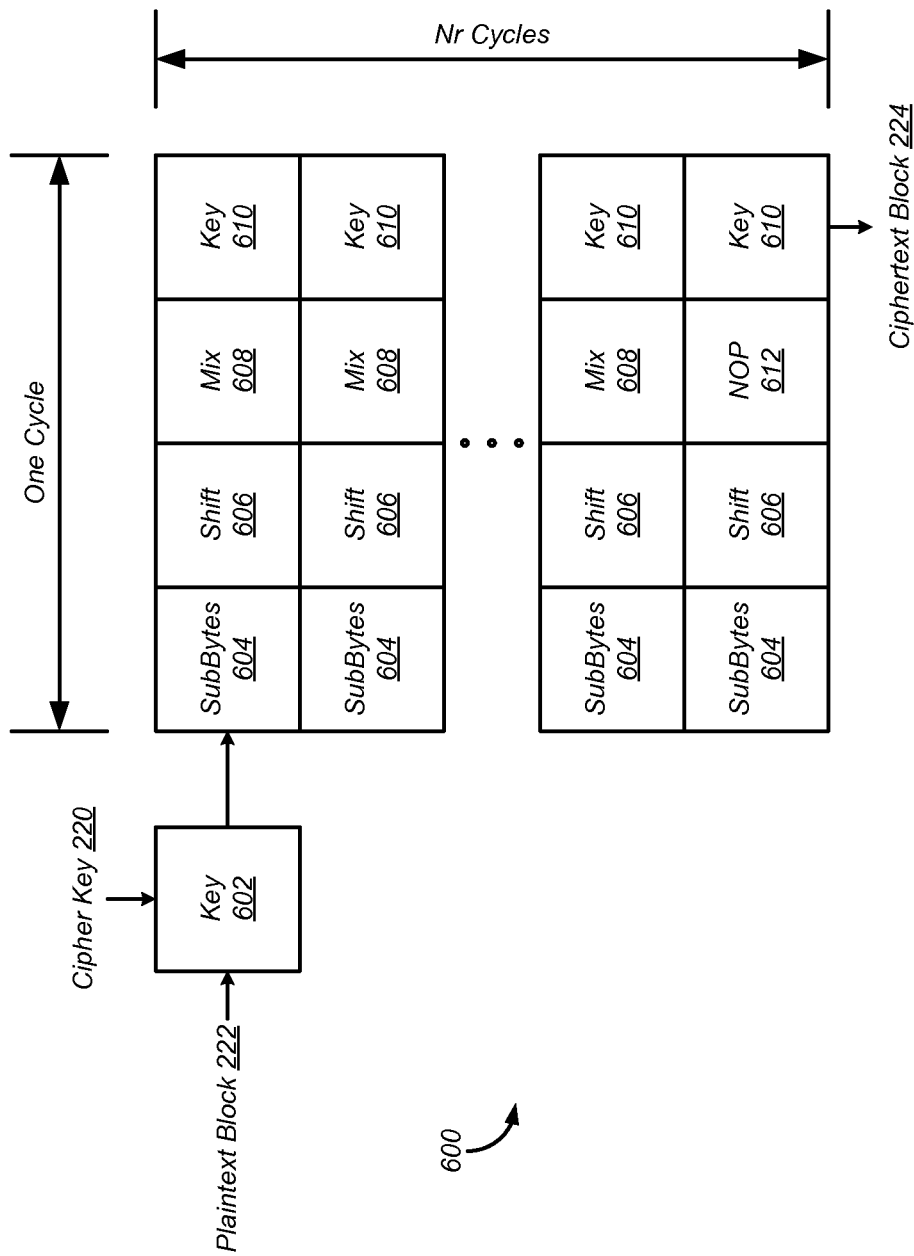
FIG. 6 shows a reshuffled encryption schedule according to some embodiments.

FIG. 6 shows a reshuffled encryption schedule 600 according to some embodiments. Schedule 600 shows the arrangement of operations within encryption module 202 (FIG. 2), including the initial external key addition and the arrangement of operations within cipher module 206. Each row of schedule 600 corresponds to one cycle of operation, which can be defined by one clock cycle in synchronous implementations.

Referring to FIG. 6, in cycle 1, the external key addition (Key) 602 is performed upon plaintext block 222 with cipher key 220. In each of cycles 1 through Nr−1, the following operations are performed in sequence: byte substitution operation (SubBytes) 604, row shift operation (Shift) 606, mix columns operation (Mix) 608, and internal key addition (Key) 610. Then in cycle Nr, the following operations are performed in sequence: byte substitution operation 604, row shift operation 606, no operation (NOP) 612, and internal key addition 610. Note NOP 612 replaces mix columns operation 608 in cycle Nr. The result of the internal key addition 610 of cycle Nr is ciphertext block 224.

Figure 7:
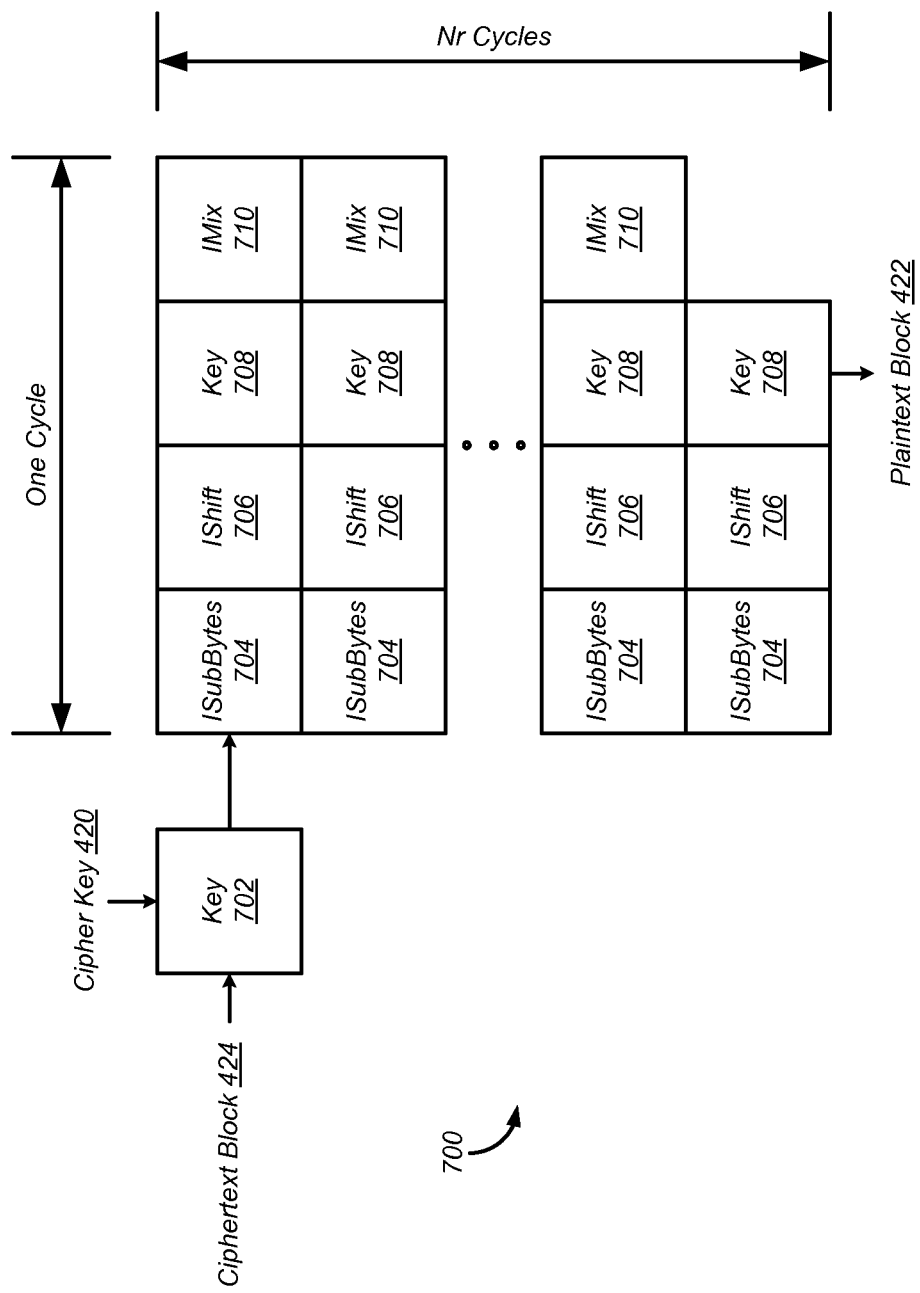
FIG. 7 shows a reshuffled decryption schedule according to some embodiments.

FIG. 7 shows a reshuffled decryption schedule 700 according to some embodiments. Schedule 700 shows the arrangement of operations within decryption module 402 (FIG. 4), including the initial external key addition and the arrangement of operations within cipher module 406. Each row of schedule 700 corresponds to one cycle of operation, which can be defined by one clock cycle in synchronous implementations.

Referring to FIG. 7, in cycle 1, the external key addition (Key) 702 is performed upon ciphertext block 424 with cipher key 420. In each of cycles 1 through Nr−1, the following operations are performed in sequence: inverse byte substitution operation (ISubBytes) 704, inverse row shift operation (IShift) 706, internal key addition (Key) 708, and inverse mix columns operation (IMix) 710. Then in cycle Nr, the following operations are performed in sequence: inverse byte substitution operation 704, inverse row shift operation 706, and internal key addition 708. The result of the internal key addition 708 of cycle Nr is plaintext block 422.

Rearranging the order of the operations within the encryption (or decryption) module, for example as described above, allows further improvements. For example, certain operations, once rearranged to be adjacent in a single cycle, can be combined, as described below.

In encryption, the byte substitution and row shift operations both operate on byte boundaries within the state. This property allows these operations to be interchanged in order, so that each mix columns operation is immediately preceded by a row shift operation. In addition, both the row shift and mix columns operations include operations with constants. Therefore the row shift and mix columns operations can be combined into a single operation. The combined operation can include a key addition as well. The resulting advantages include reduced circuit area and increased circuit speed.

Figure 8:
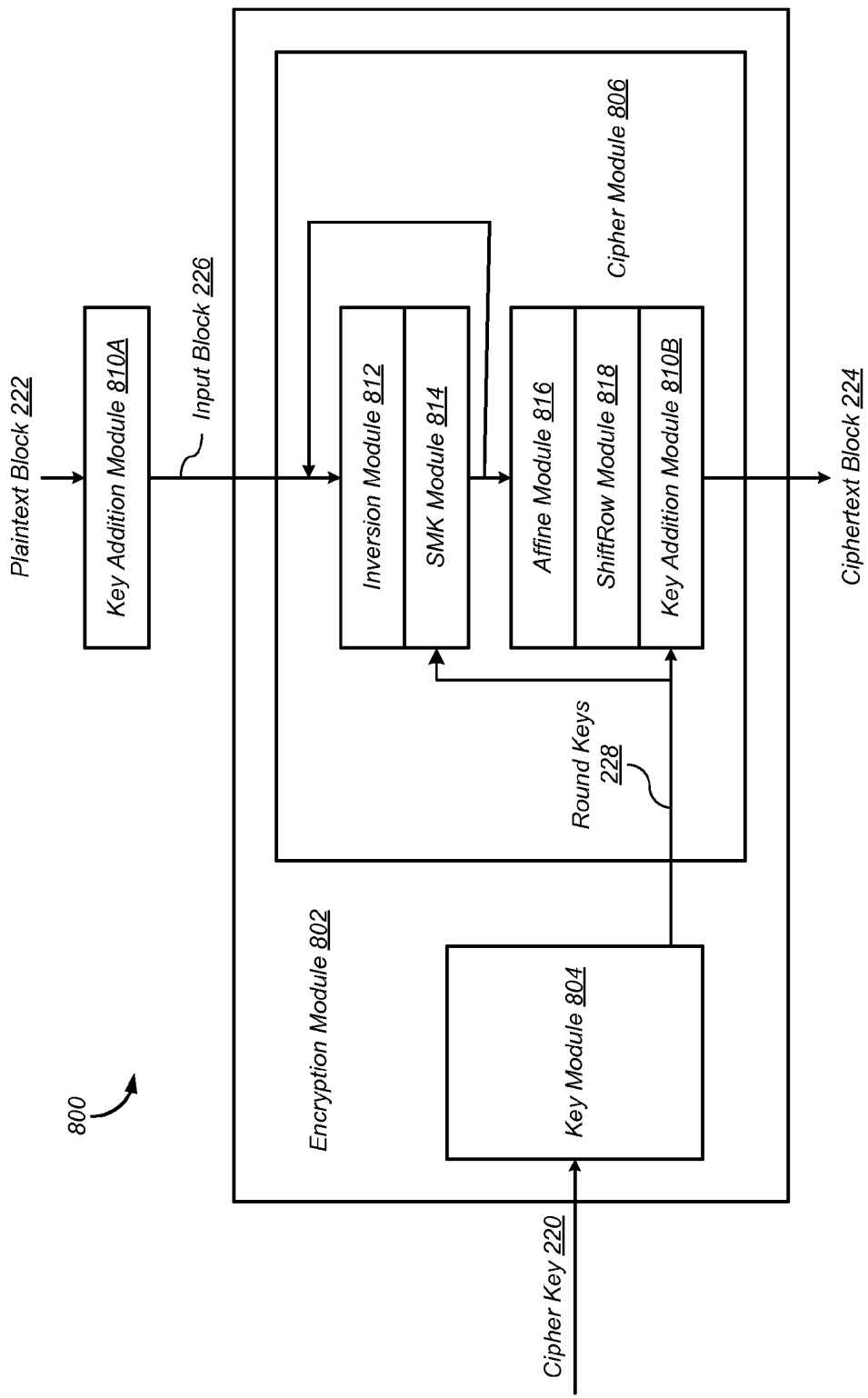
FIG. 8 shows an encryption implementation with combined operations according to some embodiments.

FIG. 8 shows an encryption implementation 800 with combined operations according to some embodiments. Although in the described embodiments, the elements of encryption implementation 800 are presented in one arrangement, other embodiments may feature other arrangements. For example, the elements of encryption implementation 800 can be implemented in hardware, software, or combinations thereof. In some embodiments, encryption implementation 800 is in compliance with the Advanced Encryption System (AES) Standard.

Referring to FIG. 8, implementation 800 includes an encryption module 802 and a key addition module 810A. Encryption module 802 includes a key module 804 and a cipher module 806. Cipher module 806 includes an inversion module 812, a combined operation (SMK) module 814, an affine module 816, a row shift (ShiftRow) module 818, and a key addition module 810B. Key addition modules 810 and row shift module 818 can be implemented according to the AES standard.

Within cipher module 806, encryption proceeds in Nr cycles. Inversion module 812 and SMK module 814 are used in rounds 1 through Nr–1. Affine module 816, row shift module 818, and key addition module 810B are used only in round Nr. The output of key addition module 810B is ciphertext block 224. This sequence of operations is illustrated by FIG. 9, described below.

Figure 9:
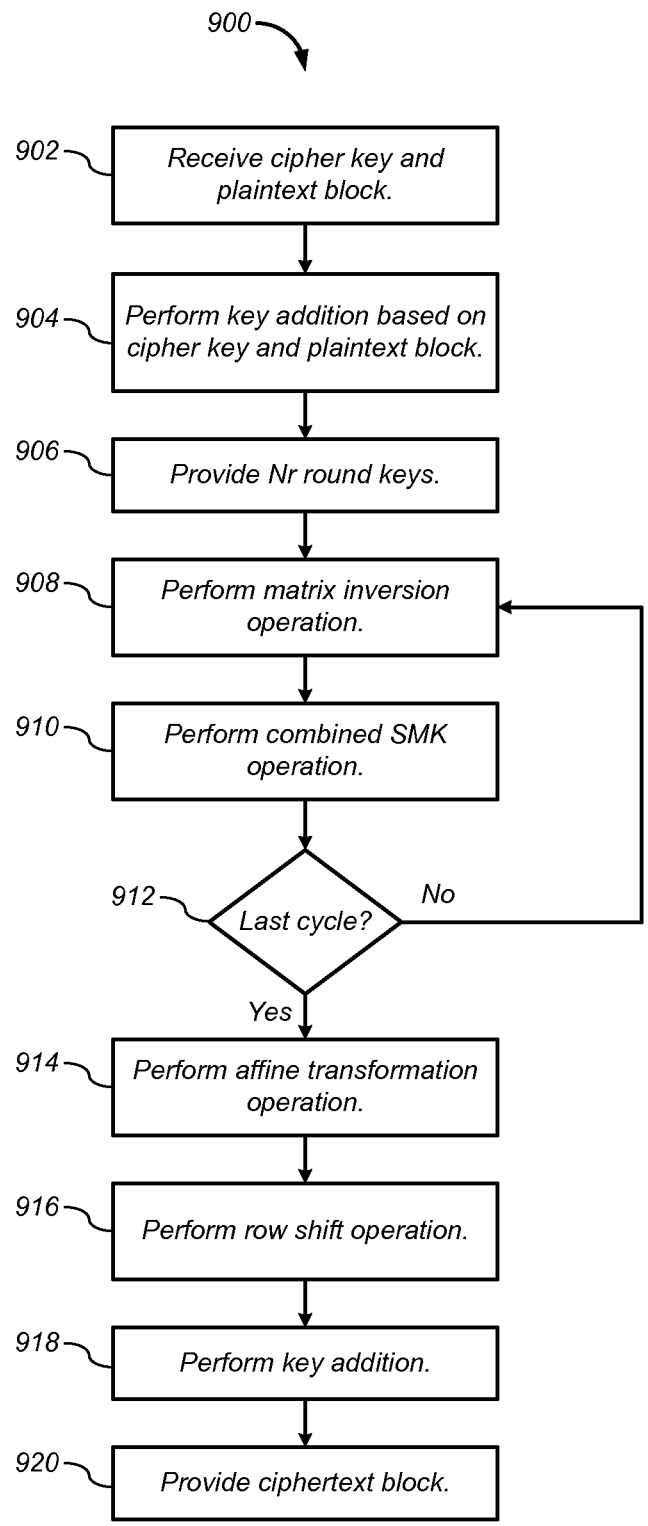
FIG. 9 shows a flowchart of an encryption process for the encryption implementation of FIG. 8 according to some embodiments.

FIG. 9 shows a flowchart of an encryption process 900 for encryption implementation 800 of FIG. 8 according to some embodiments. Although in the described embodiments, the elements of process 900 are presented in one arrangement, other embodiments may feature other arrangements. For example, in various embodiments, some or all of the steps of process 900 can be executed in a different order, concurrently, and the like. In some embodiments, process 900 is in compliance with the Advanced Encryption System (AES) Standard.

Referring to FIG. 9, implementation 800 receives cipher key 220 and plaintext block 222 (step 902). Key addition module 810A performs key addition based on cipher key 220 and plaintext block 222 (step 904). For example, the key addition can be an exclusive-OR operation. In AES implementations, the key addition can be as specified by the AES standard. The result of the key addition is shown in FIG. 8 as input block 226.

Next encryption module 802 generates ciphertext block 224 based on cipher key 220 and input block 226, for example according to the process described below. Key module 804 provides Nr round keys 228 (FIG. 8) based on cipher key 220 (step 906). Key module 804 can provide round keys 228 according to any technique. For example, key expansion can be used to generate round keys 228 based on cipher key 220. In AES embodiments, the key expansion can be as specified by the AES standard. Key module 804 can provide round keys 228 in parallel with the operations of cipher module 806.

Cipher module 806 performs Nr cycles of encryption based on input block 226 and round keys 228 according to the process described below. Each of the Nr cycles of encryption employs a respective round key 228.

Inversion module 812 generates a state based on input block 226 and a matrix inversion operation (step 908). The matrix inversion operation can be a matrix inversion. SMK module 814 generates a state based on the state generated by inversion module 812, a respective round key 228, and a combined SMK operation (step 910). The combined SMK operation includes an affine transformation operation, a mix columns operation, and a key addition operation. The matrix inversion operation, affine transformation operation, and mix columns operation can be as defined by the AES standard.

If the last cycle has not been reached (step 912), the state generated by SMK module 814 is passed to inversion module 812, which generates a state based on the state generated by SMK module 814 and the matrix inversion operation (step 908). Steps 908 and 910 repeat until the last cycle of encryption, cycle Nr, is reached (step 912).

During the last cycle, the state generated by SMK module 814 is passed to affine module 816, which generates a state based on the state generated by SMK module 814 and the affine transformation operation (step 914). Then row shift module 818 generates a state based on the state generated by affine module 816 and a row shift operation (step 916). Finally, key addition module 810B generates ciphertext block 824 based on the final round key 228 and the state generated by row shift module 818 (step 918). Encryption module 802 then provides ciphertext block 224 (step 920).

Figure 10:
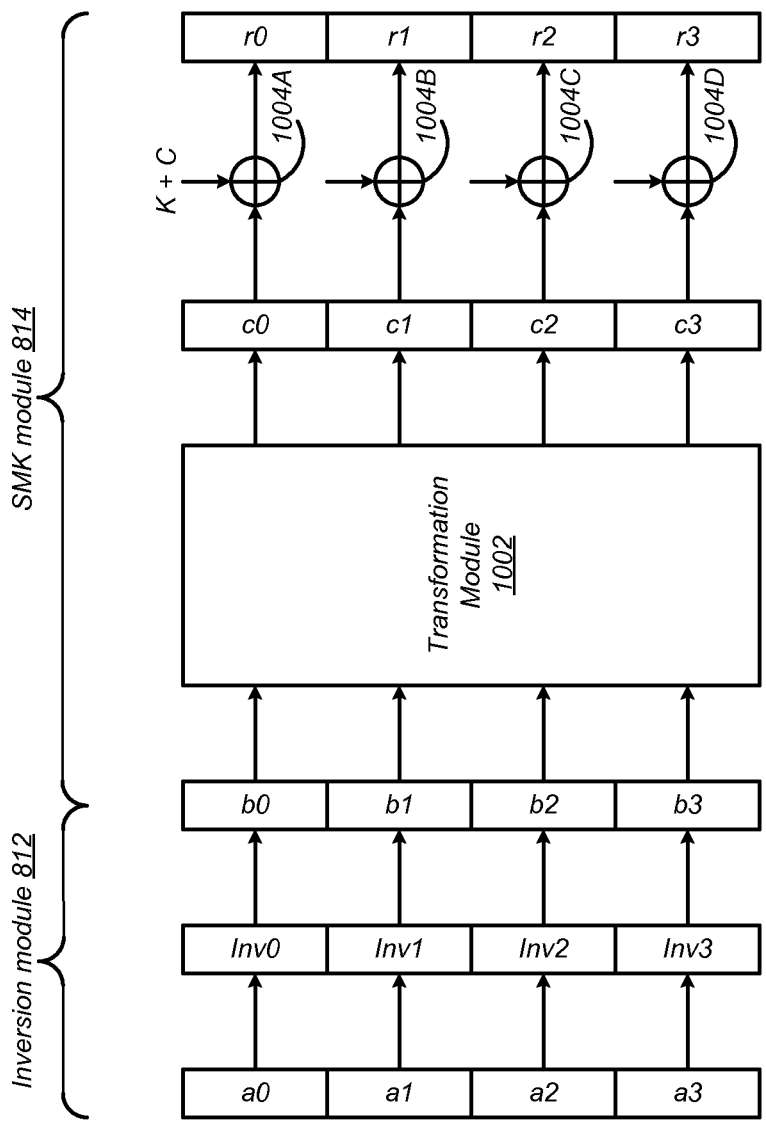
FIG. 10 shows detail of the inversion module and the SMK module of FIG. 8 according to some embodiments.

FIG. 10 shows detail of inversion module 812 and SMK module 814 of FIG. 8 according to some embodiments. Although in the described embodiments, the elements of inversion module 812 and SMK module 814 are presented in one arrangement, other embodiments may feature other arrangements. For example, the elements of inversion module 812 and SMK module 814 can be implemented in hardware, software, or combinations thereof. In some embodiments, inversion module 812 and SMK module 814 are in compliance with the Advanced Encryption System (AES) Standard.

Referring to FIG. 10, four bytes a0-a3 from a column of the state are processed into four bytes r0-r3, respectively. Inversion module 812 includes four inverse modules Inv0-Inv3. Each inversion module generates a multiplicative inverse of the respective byte a0-a3 over the Galois Field ($2^8$). The multiplicative inverse can be as defined by the AES standard for the SubBytes operation. The results are shown as bytes b0-b3.

SMK module 814 includes a transformation module 1002 and four adders 1004A-D. The results of the transformation are shown as bytes c0-c3. The transformation is defined by equations (1)-(4) below.

$$c0 = D2*b0 + D1*b3 + D1*b2 + D3*b1 \quad (1)$$

$$c1 = D2*b1 + D1*b0 + D1*b3 + D3*b2 \quad (2)$$

$$c2 = D2*b2 + D1*b1 + D1*b0 + D3*b3 \quad (3)$$

$$c3 = D2*b3 + D1*b2 + D1*b1 + D3*b0 \quad (4)$$

where * denotes matrix multiplication, and the matrices D are given by equations (5)-(7) below.

$$D1 = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \quad (5)$$

$$D2 = \begin{bmatrix} 0 & 0 & 0 & 1 & 1 & 1 & 1 & 1 \\ 1 & 0 & 0 & 1 & 0 & 0 & 0 & 0 \\ 1 & 1 & 0 & 0 & 0 & 1 & 1 & 1 \\ 1 & 1 & 1 & 1 & 1 & 1 & 0 & 0 \\ 1 & 1 & 1 & 0 & 1 & 1 & 1 & 0 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \end{bmatrix} \quad (6)$$

$$D3 = \begin{bmatrix} 1 & 0 & 0 & 1 & 0 & 0 & 0 & 0 \\ 0 & 1 & 0 & 1 & 0 & 1 & 1 & 1 \\ 0 & 0 & 1 & 0 & 0 & 1 & 0 & 0 \\ 0 & 0 & 0 & 0 & 1 & 1 & 0 & 1 \\ 0 & 0 & 0 & 1 & 0 & 1 & 1 & 0 \\ 1 & 0 & 0 & 0 & 0 & 1 & 0 & 0 \\ 0 & 1 & 0 & 0 & 0 & 0 & 1 & 0 \\ 0 & 0 & 1 & 0 & 0 & 0 & 0 & 1 \end{bmatrix} \quad (7)$$

Adders 1004A-D then add the constant K+C to each byte c, as shown in equations (8)-(11) below.

$$r0 = c0 + K + C \quad (8)$$

$$r1 = c1 + K + C \quad (9)$$

$$r2 = c2 + K + C \quad (10)$$

$$r3 = c3 + K + C \quad (11)$$

K is the respective round key 228 and C is given by equation (12) below.

$$C = \begin{bmatrix} 1 \\ 1 \\ 0 \\ 0 \\ 0 \\ 1 \\ 1 \\ 0 \end{bmatrix} \quad (12)$$

In decryption, the inverse byte substitution and inverse row shift operations both operate on byte boundaries within the state. This property allows these operations to be interchanged in order, so that each inverse mix columns operation is immediately preceded by an inverse row shift operation. In addition, both the inverse row shift and inverse mix columns operations include operations with constants. Therefore the inverse row shift and inverse mix columns operations can be combined into a single operation. The combined operation can include a key addition as well. The resulting advantages include reduced circuit area and increased circuit speed.

Figure 11:
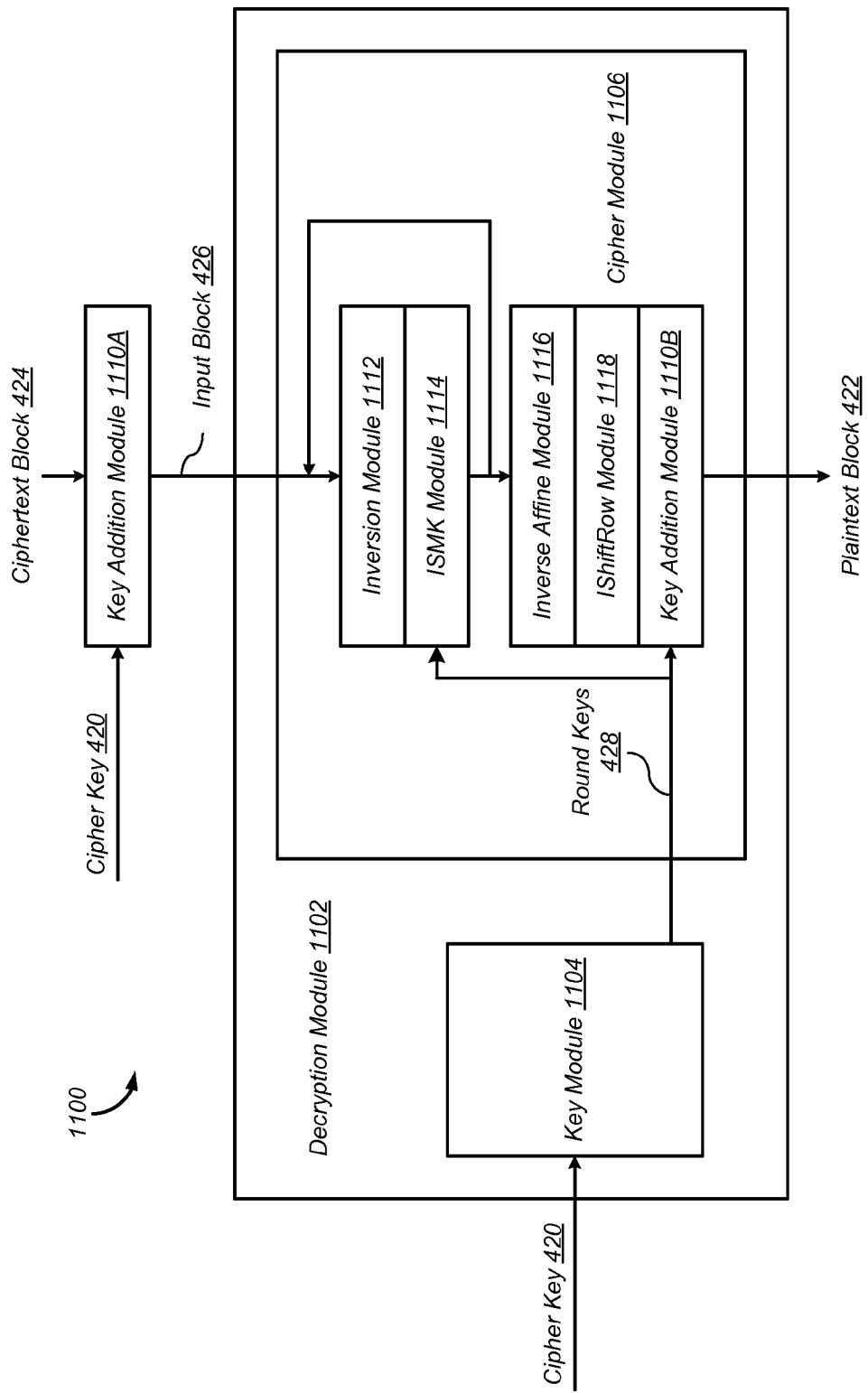
FIG. 11 shows a decryption implementation with combined operations according to some embodiments.

FIG. 11 shows a decryption implementation 1100 with combined operations according to some embodiments. Although in the described embodiments, the elements of decryption implementation 1100 are presented in one arrangement, other embodiments may feature other arrangements. For example, the elements of decryption implementation 1100 can be implemented in hardware, software, or combinations thereof. In some embodiments, decryption implementation 1100 is in compliance with the Advanced Encryption System (AES) Standard.

Referring to FIG. 11, implementation 1100 includes a decryption module 1102 and a key addition module 1110A. Decryption module 1102 includes a key module 1104 and a cipher module 1106. Cipher module 1106 includes an inversion module 1112, a combined inverse operation (ISMK) module 1114, an inverse affine module 1116, an inverse row shift (IShiftRow) module 1118, and a key addition module 11106. Key addition modules 1110 and inverse row shift module 1118 can be implemented according to the AES standard.

Within cipher module 1106, decryption proceeds in Nr cycles. Inversion module 1112 and ISMK module 1114 are used in rounds 1 through Nr−1. Inverse affine module 1116, inverse row shift module 1118, and key addition module 11106 are used only in round Nr. The output of key addition module 11106 is plaintext block 222. This sequence of operations is illustrated by FIG. 12, described below.

Figure 12:
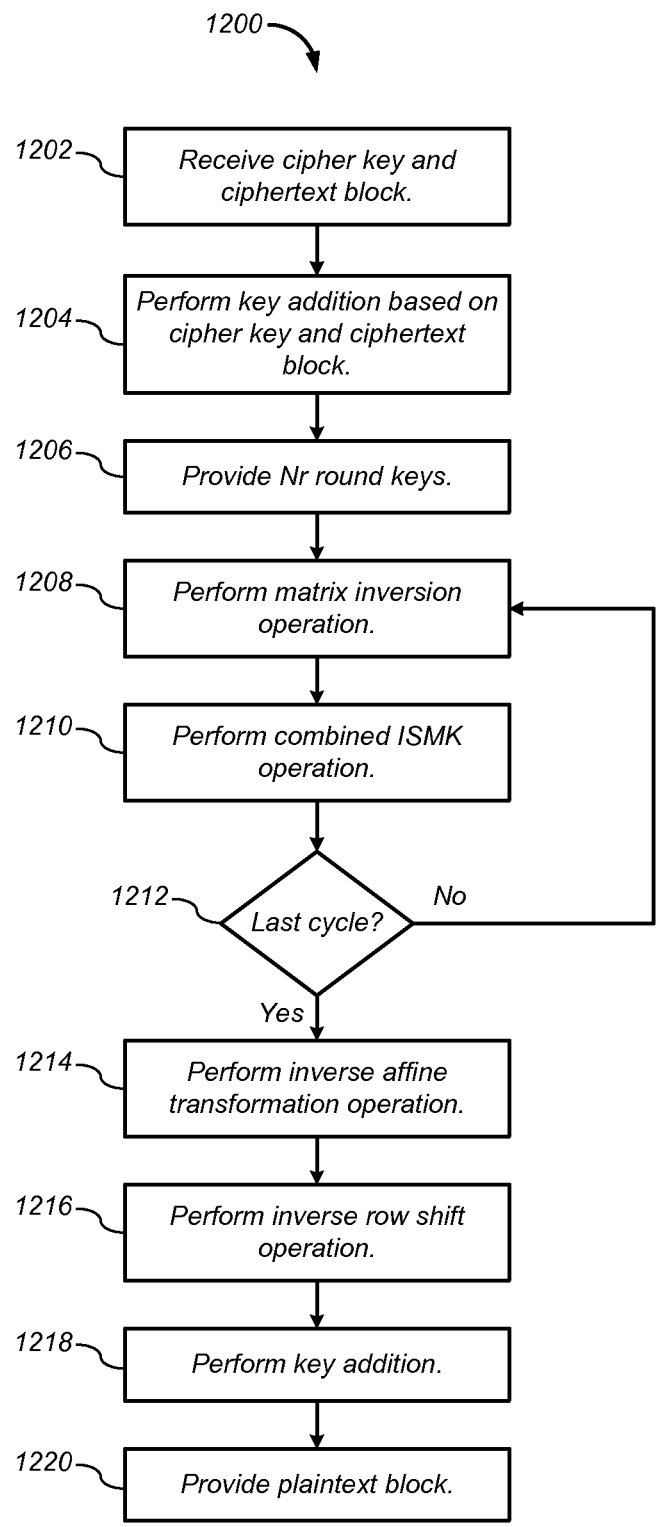
FIG. 12 shows a flowchart of an decryption process for the decryption implementation of FIG. 11 according to some embodiments.

FIG. 12 shows a flowchart of an decryption process 1200 for decryption implementation 1100 of FIG. 11 according to some embodiments. Although in the described embodiments, the elements of process 1200 are presented in one arrangement, other embodiments may feature other arrangements. For example, in various embodiments, some or all of the steps of process 1200 can be executed in a different order, concurrently, and the like. In some embodiments, process 1200 is in compliance with the Advanced Encryption System (AES) Standard.

Referring to FIG. 12, implementation 1100 receives cipher key 420 and ciphertext block 424 (step 1202). Key addition module 1110A performs key addition based on cipher key 420 and ciphertext block 424 (step 1204). For example, the key addition can be an exclusive-OR operation. In AES implementations, the key addition can be as specified by the AES standard. The result of the key addition is shown in FIG. 11 as input block 426.

Next decryption module 1102 generates plaintext block 422 based on cipher key 420 and input block 426 according to the process described below. Key module 1104 provides Nr round keys 428 (FIG. 11) based on cipher key 420 (step 1206). Key module 1104 can provide round keys 428 according to any technique. For example, reverse key expansion can be used to generate round keys 428 based on cipher key 420, as described in U.S. patent application Ser. No. 12/169,044 filed Jul. 8, 2008, the disclosure thereof incorporated by reference herein in its entirety. Key module 1104 can provide round keys 428 in parallel with the operations of cipher module 1106.

Cipher module 1106 performs Nr cycles of decryption based on input block 426 and round keys 428 according to the process described below. Each of the Nr cycles of decryption employs a respective round key 428.

Inversion module 1112 generates a state based on input block 426 and a matrix inversion operation (step 1208). The matrix inversion operation can be a matrix inversion. ISMK module 1114 generates a state based on the state generated by inversion module 1112, a respective round key 428, and a combined ISMK operation (step 1210). The combined ISMK operation includes an inverse affine transformation operation, an inverse mix columns operation, and a key addition operation. The matrix inversion operation, inverse affine transformation operation, and inverse mix columns operation can be as defined by the AES standard.

If the last cycle has not been reached (step 1212), the state generated by ISMK module 1114 is passed to inversion module 1112, which generates a state based on the state generated by ISMK module 1114 and the matrix inversion operation (step 1208). Steps 1208 and 1210 repeat until the last cycle of decryption, cycle Nr, is reached (step 1212).

During the last cycle, the state generated by ISMK module 1114 is passed to affine module 1116, which generates a state based on the state generated by ISMK module 1114 and the inverse affine transformation operation (step 1214). Then inverse row shift module 1118 generates a state based on the state generated by inverse affine module 1116 and an inverse row shift operation (step 1216). Finally, key addition module 111013 generates plaintext block 1122 based on the final round key 428 and the state generated by inverse row shift module 1118 (step 1218). Decryption module 1102 then provides plaintext block 1122 (step 1220).

Figure 13:
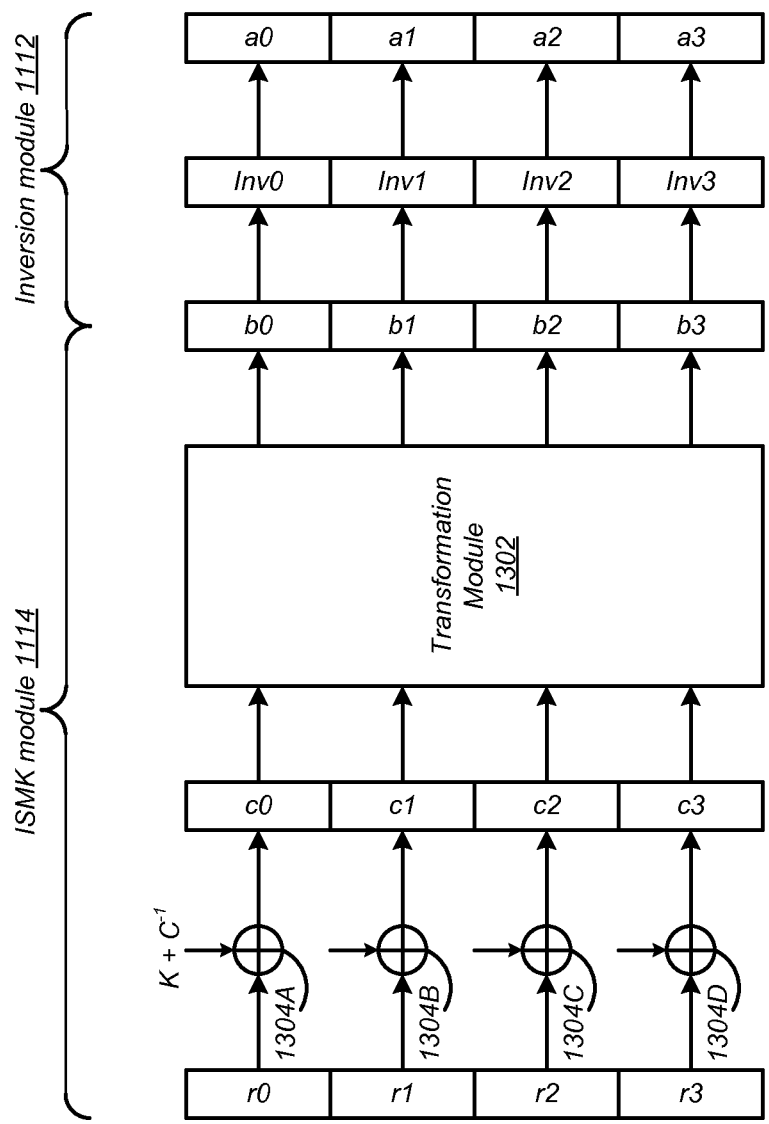
FIG. 13 shows detail of the inversion module and the ISMK module of FIG. 11 according to some embodiments.

FIG. 13 shows detail of inversion module 1112 and ISMK module 1114 of FIG. 11 according to some embodiments. Although in the described embodiments, the elements of inversion module 1112 and ISMK module 1114 are presented in one arrangement, other embodiments may feature other arrangements. For example, the elements of inversion module 1112 and ISMK module 1114 can be implemented in hardware, software, or combinations thereof. In some embodiments, inversion module 1112 and ISMK module 1114 are in compliance with the Advanced Encryption System (AES) Standard.

Referring to FIG. 13, four bytes r0-r3 from a column of the state are processed into four bytes a0-a3, respectively. ISMK module 1114 includes a transformation module 1302 and four adders 1304A-D. Adders 1304A-D add the constant $K+C^{-1}$ to each byte r, as shown in equations (13)-(16) below.

$$c0 = r0 + K + C^{-1} \quad (13)$$

$$c1 = r1 + K + C^{-1} \quad (14)$$

$$c2 = r2 + K + C^{-1} \quad (15)$$

$$c3 = r3 + K + C^{-1} \quad (16)$$

K is the respective round key 428. $C^{-1}$ is given by equation (17) below.

$$C^{-1} = \begin{bmatrix} 1 \\ 0 \\ 1 \\ 0 \\ 0 \\ 0 \\ 0 \\ 0 \end{bmatrix} \quad (17)$$

The results of the transformation are shown as bytes b0-b3. The transformation is defined by equations (18)-(21) below.

$$b0 = E14 * c0 + E9 * c3 + E13 * c2 + E11 * c1 \quad (18)$$

$$b1 = E14 * c1 + E9 * c0 + E13 * c3 + E11 * c2 \quad (19)$$

$$b2 = E14 * c2 + E9 * c1 + E13 * c0 + E11 * c3 \quad (20)$$

$$b3 = E14 * c3 + E9 * c2 + E13 * c1 + E11 * c0 \quad (21)$$

where * denotes matrix multiplication, and the matrices E are given by equations (22)-(25) below.

$$E9 = \begin{bmatrix} 1 & 0 & 0 & 0 & 0 & 1 & 0 & 0 \\ 0 & 1 & 0 & 0 & 0 & 1 & 1 & 0 \\ 0 & 0 & 1 & 0 & 0 & 0 & 1 & 1 \\ 1 & 0 & 0 & 1 & 0 & 1 & 0 & 1 \\ 0 & 1 & 0 & 0 & 1 & 1 & 1 & 0 \\ 0 & 0 & 1 & 0 & 0 & 1 & 1 & 1 \\ 0 & 0 & 0 & 1 & 0 & 0 & 1 & 1 \\ 0 & 0 & 0 & 0 & 1 & 0 & 0 & 1 \end{bmatrix} \quad (22)$$

$$E11 = \begin{bmatrix} 1 & 0 & 0 & 0 & 0 & 1 & 0 & 1 \\ 1 & 1 & 0 & 0 & 0 & 1 & 1 & 1 \\ 0 & 1 & 1 & 0 & 0 & 0 & 1 & 1 \\ 1 & 0 & 1 & 1 & 0 & 1 & 0 & 0 \\ 0 & 1 & 0 & 1 & 1 & 1 & 1 & 1 \\ 0 & 0 & 1 & 0 & 1 & 1 & 1 & 1 \\ 0 & 0 & 0 & 1 & 0 & 1 & 1 & 1 \\ 0 & 0 & 0 & 0 & 1 & 0 & 1 & 1 \end{bmatrix} \quad (23)$$

$$E13 = \begin{bmatrix} 1 & 0 & 0 & 0 & 0 & 1 & 1 & 0 \\ 0 & 1 & 0 & 0 & 0 & 1 & 0 & 1 \\ 1 & 0 & 1 & 0 & 0 & 0 & 1 & 0 \\ 1 & 1 & 1 & 1 & 0 & 1 & 1 & 1 \\ 0 & 0 & 0 & 1 & 1 & 1 & 0 & 1 \\ 0 & 0 & 1 & 0 & 0 & 1 & 1 & 0 \\ 0 & 0 & 0 & 1 & 1 & 0 & 1 & 1 \\ 0 & 0 & 0 & 0 & 1 & 1 & 0 & 1 \end{bmatrix} \quad (24)$$

$$E14 = \begin{bmatrix} 0 & 0 & 0 & 0 & 0 & 1 & 1 & 1 \\ 1 & 0 & 0 & 0 & 0 & 1 & 0 & 0 \\ 1 & 1 & 0 & 0 & 0 & 0 & 1 & 0 \\ 1 & 1 & 1 & 0 & 0 & 1 & 1 & 0 \\ 0 & 1 & 1 & 1 & 1 & 1 & 0 & 0 \\ 0 & 0 & 1 & 1 & 1 & 0 & 1 & 0 \\ 0 & 0 & 0 & 1 & 1 & 1 & 0 & 1 \\ 0 & 0 & 0 & 0 & 1 & 1 & 1 & 0 \end{bmatrix} \quad (25)$$

Inversion module 1112 includes four inverse modules Inv0-Inv3. Each inversion module Inv generates a multiplicative inverse of the respective byte b0-b3 over the Galois Field ($2^8$). The multiplicative inverse can be as defined by the AES standard for the SubBytes operation. The results are shown as bytes a0-a3.

Combining the operations within the encryption (or decryption) module, for example as described above, allows further improvements. For example, modules for certain operations can be duplicated, so that multiple iterations of these operations can be performed in a single cycle, as described below. For AES implementations, the number of cycles can be reduced to 8 cycles, 10 cycles, and 12 cycles for 128-bit, 192-bit, and 256-bit keys, respectively.

In encryption, inversion module 812 and SMK module 814 (FIG. 8) can be replicated and rearranged in tandem so that, in each cycle but the last, cipher module 806 employs both inversion modules 812 or both SMK modules 814. This arrangement requires fewer cycles for encryption than conventional arrangements because two iterations of an operation can be performed in a single cycle. The resulting advantages include increased throughput. In other embodiments, more than two of each module can be implemented in a single cycle for even greater throughput.

Figure 14:
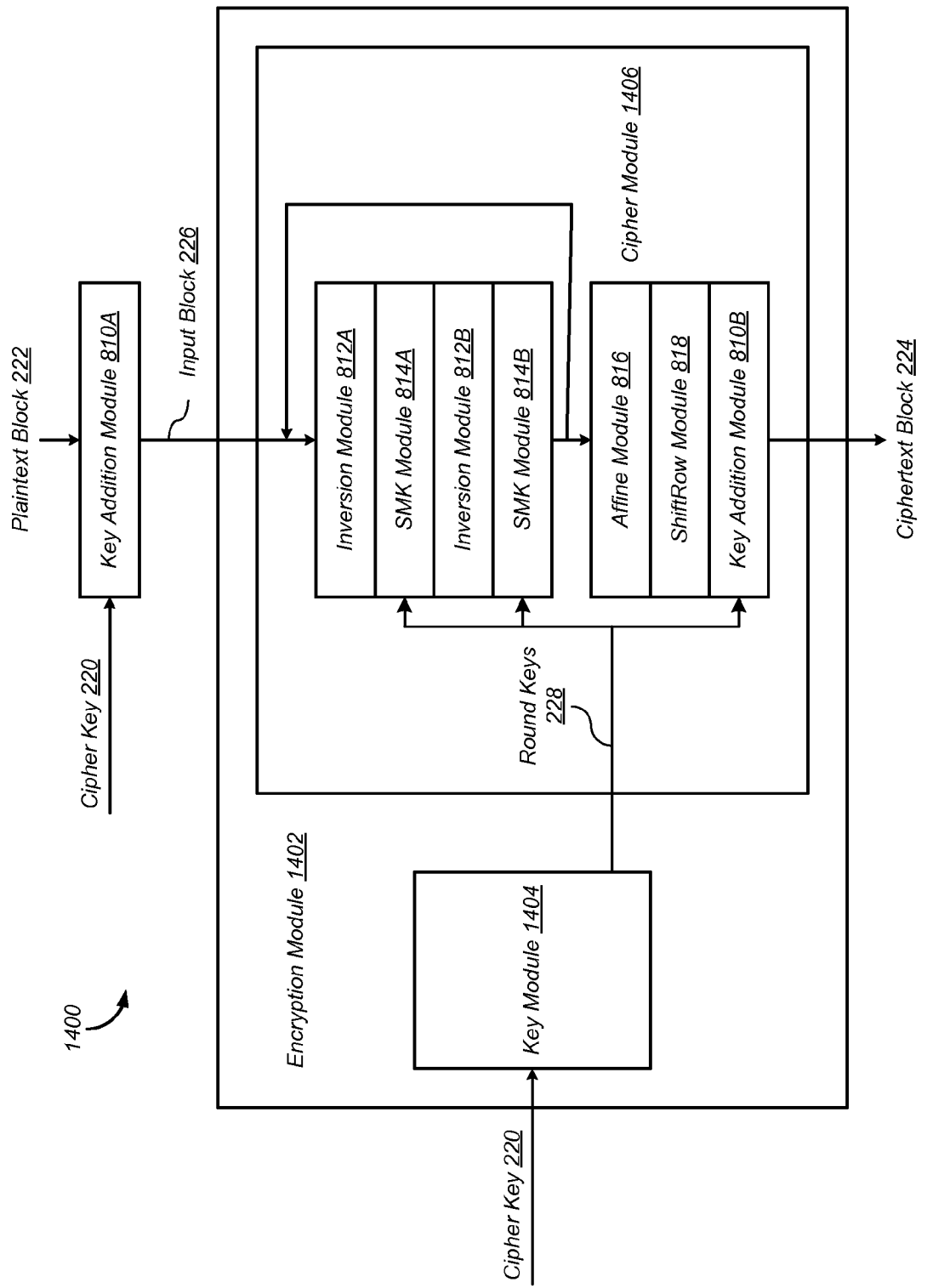
FIG. 14 shows an encryption implementation with tandem operations according to some embodiments.

FIG. 14 shows an encryption implementation 1400 with tandem operations according to some embodiments. Although in the described embodiments, the elements of encryption implementation 1400 are presented in one arrangement, other embodiments may feature other arrangements. For example, the elements of encryption implementation 1400 can be implemented in hardware, software, or combinations thereof. In some embodiments, encryption implementation 1400 is in compliance with the Advanced Encryption System (AES) Standard.

Referring to FIG. 14, implementation 1400 includes an encryption module 1402 and a key addition module 810A. Encryption module 1402 includes a key module 1404 and a cipher module 1406. Cipher module 1406 includes two inversion modules 812A and 812B, two combined operation (SMK) modules 814A and 814B, affine module 816, row shift module (ShiftRow) 818, and key addition module 810B. Key addition modules 810 and row shift module 818 can be implemented according to the AES standard.

Figure 15:
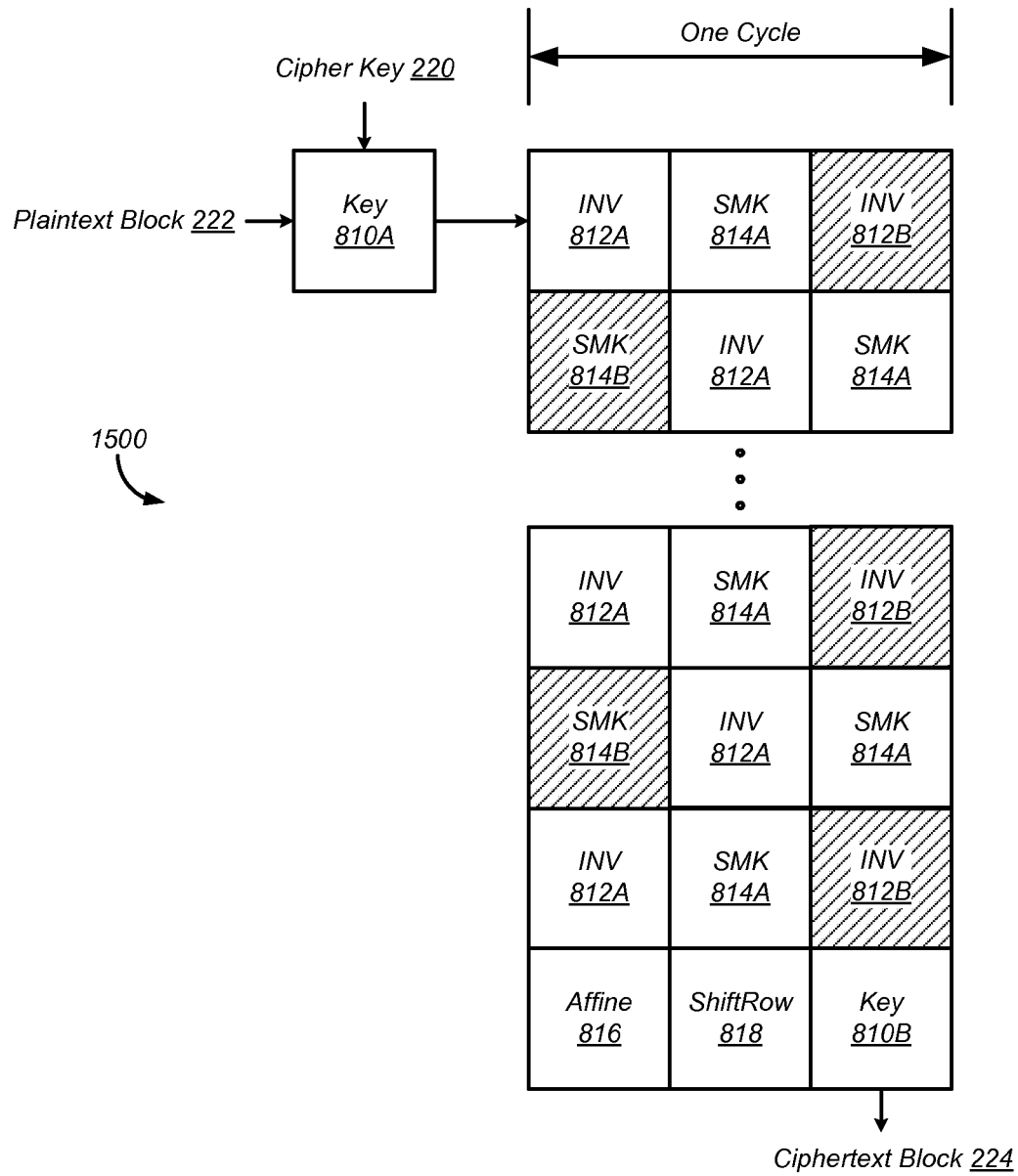
FIG. 15 shows a tandem encryption schedule for the tandem encryption implementation of FIG. 14 for a 256-bit cipher key according to some embodiments.

FIG. 15 shows a tandem encryption schedule 1500 for the tandem encryption implementation 1400 of FIG. 14 for a 256-bit cipher key 220 according to some embodiments. Schedule 1500 shows the arrangement of operations within encryption module 1402, including the initial external key addition and the arrangement of operations within cipher module 1406. Each row of schedule 1500 corresponds to one cycle of operation, which can be defined by one clock cycle in synchronous implementations. For clarity, inversion module 812B and SMK module 814B are shown as cross-hatched in FIG. 15.

Also for clarity, the row shift operations are not shown in FIGS. 14 and 15. The row shift operations are generally implemented by wire routing rather than by logic circuits, and so do not consume a significant portion of a clock cycle. It will be understood that a row shift operation occurs between each inversion operation and the following SMK operation.

Referring to FIG. 15, in cycle 1, the external key addition (Key at 810A) is performed upon plaintext block 222 with cipher key 220. In each cycle but the last, cipher module 1406 employs both inversion modules 812A and 812B or both combined operation modules 814A and 814B. For example, referring to FIG. 15, in cycle 1, cipher module 1406 employs both inversion modules 812A and 812B, thereby performing two inversion operations in cycle 1. Similarly, in cycle 2, cipher module 1406 employs both combined operation modules 814A and 814B, thereby performing two combined SMK operations in cycle 2. This pattern is repeated. Of course, in other implementations, other patterns can be employed. In the last cycle, cipher module 1406 employs affine module 816, row shift module 818, and key addition module 810B.

In decryption, inversion module 1112 and ISMK module 1114 (FIG. 11) can be replicated and rearranged in tandem so that, in each cycle but the last, cipher module 1106 employs both inversion modules 1112 or both ISMK modules 1114. This arrangement requires fewer cycles for decryption than conventional arrangements because two iterations of an operation can be performed in a single cycle. The resulting advantages include increased throughput. In other embodiments, more than two of each module can be implemented in a single cycle for even greater throughput.

Figure 16:
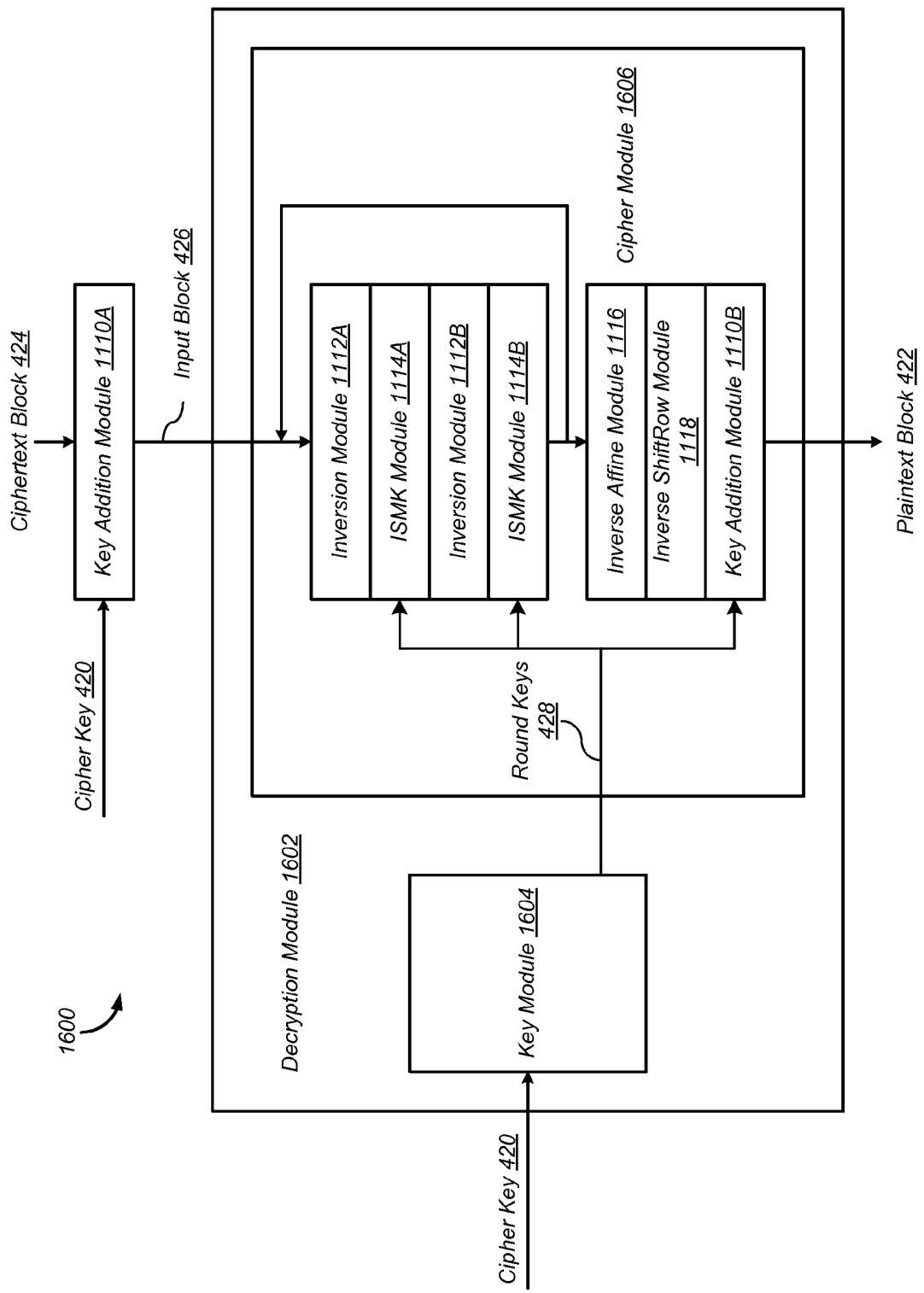
FIG. 16 shows a decryption implementation with tandem operations according to some embodiments.

FIG. 16 shows a decryption implementation 1600 with tandem operations according to some embodiments. Although in the described embodiments, the elements of decryption implementation 1600 are presented in one arrangement, other embodiments may feature other arrangements. For example, the elements of decryption implementation 1600 can be implemented in hardware, software, or combinations thereof. In some embodiments, decryption implementation 1600 is in compliance with the Advanced Encryption System (AES) Standard.

Referring to FIG. 16, implementation 1600 includes a decryption module 1602 and a key addition module 1110A. Decryption module 1602 includes a key module 1604 and a cipher module 1606. Cipher module 1606 includes two inversion modules 1112A and 1112B, two combined inverse operation (ISMK) modules 1114A and 1114B, inverse affine module 1116, inverse row shift module (IShiftRow) 1118, and key addition module 11106. Key addition modules 1110 and inverse row shift module 1118 can be implemented according to the AES standard.

Figure 17:
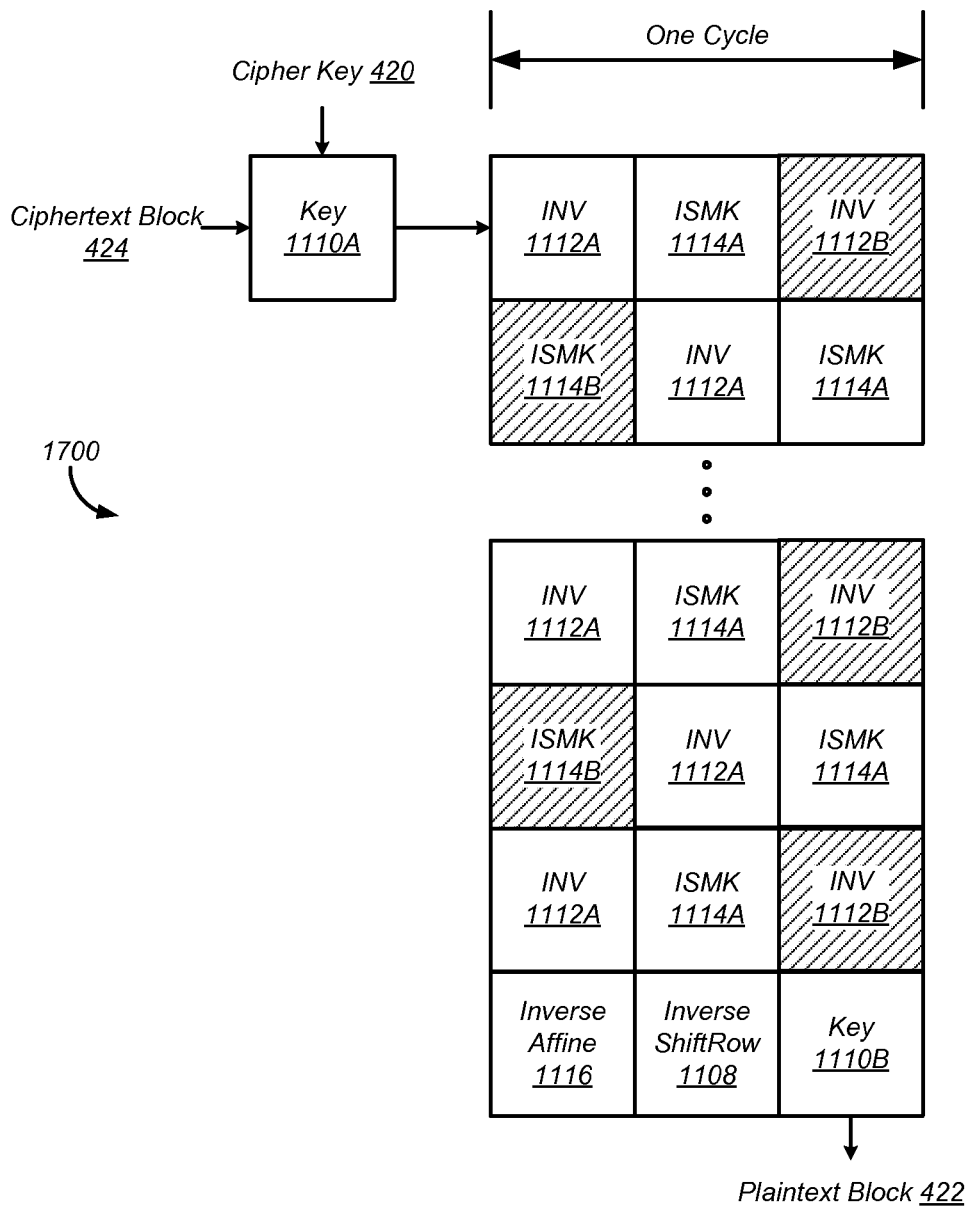
FIG. 17 shows a tandem decryption schedule for the tandem decryption implementation of FIG. 16 for a 256-bit cipher key according to some embodiments.

FIG. 17 shows a tandem decryption schedule 1700 for the tandem decryption implementation 1600 of FIG. 16 for a 256-bit cipher key 420 according to some embodiments. Schedule 1700 shows the arrangement of operations within decryption module 1602, including the initial external key addition and the arrangement of operations within cipher module 1606. Each row of schedule 1700 corresponds to one cycle of operation, which can be defined by one clock cycle in synchronous implementations. For clarity, inversion module 1112B and ISMK module 1114B are shown as cross-hatched in FIG. 17.

Also for clarity, the inverse row shift operations are not shown in FIGS. 16 and 17. The inverse row shift operations are generally implemented by wire routing rather than by logic circuits, and so do not consume a significant portion of a clock cycle. It will be understood that an inverse row shift operation occurs between each inversion operation and the following ISMK operation.

Referring to FIG. 17, in cycle 1, the external key addition (Key) 1702 is performed upon ciphertext block 424 with cipher key 420. In each cycle but the last, cipher module 1606 employs both inversion modules 1112A and 1112B or both combined inverse operation modules 1114A and 1114B. For example, referring to FIG. 17, in cycle 1, cipher module 1606 employs both inversion modules 1112A and 1112B, thereby performing two inversion operations in cycle 1. Similarly, in cycle 2, cipher module 1606 employs both combined inverse operation modules 1114A and 111413, thereby performing two combined ISMK operations in cycle 2. This pattern is repeated. Of course, in other implementations, other patterns can be employed. In the last cycle, cipher module 1606 employs inverse affine module 1116, inverse row shift module 1118, and key addition module 11106.

Other improvements are possible based on the above-described techniques. For example, certain modules can be used for both encryption and decryption. As one example, in the tandem embodiments, hardware elements such as the inverse modules (1412 in FIGS. 14 and 1612 in FIG. 16) and the key addition modules (1410 in FIGS. 14 and 1610 in FIG. 16) can be used for both encryption and decryption.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A cryptographic device comprising:
a key addition module configured to generate an input block based on (i) a cipher key and (ii) a plaintext block;
a first module configured to generate an output block by performing a plurality of rounds of processing on the input block; and
a key module configured to, for each of the rounds, provide a round key based on the cipher key,
wherein the first module comprises
an inversion module configured to, for each of the rounds, perform a matrix inversion operation on first intermediate data to generate second intermediate data, wherein, in a first round of the rounds, the first intermediate data is set equal to the input block, and
a combined operation module configured to, for each of the rounds, update the first intermediate data by performing an affine transformation operation and a mix columns operation on the second intermediate data.

2. The cryptographic device of claim 1, further comprising a second key addition module configured to generate a ciphertext block in response to the output block.

3. The cryptographic device of claim 2, wherein the first module further comprises:
an affine module configured to generate a second block by performing an affine transformation on the output block; and
a row shifting module configured to generate a third block by performing row shifting on the second block,
wherein the second key addition module is configured to generate the ciphertext block by adding a last round key to the third block.

4. The cryptographic device of claim 3, wherein the row shifting module is implemented using wire routing.

5. The cryptographic device of claim 1, wherein the cryptographic device is configured to be compliant with the Advanced Encryption Standard (AES).

6. The cryptographic device of claim 1, wherein the inversion module is configured to perform a multiplicative inverse on each byte of the first intermediate data.

7. The cryptographic device of claim 6, wherein the inversion module is configured to perform the multiplicative inverse over a Galois Field with $2^8$ elements.

8. The cryptographic device of claim 1, wherein the combined operation module comprises:
a transformation module configured to transform a group of bytes of the second intermediate data to create a group of transformed bytes; and
a plurality of adders configured to add a respective round constant to each byte of the group of transformed bytes to generate a respective byte of the first intermediate data.

9. The cryptographic device of claim 8, wherein the respective round constants are based on a sum of a component of an affine constant and a component of the respective round key.

10. The cryptographic device of claim 1, wherein the combined operation module is further configured to perform key addition in order to generate the first intermediate data.

11. The cryptographic device of claim 10, wherein the combined operation module is configured to:
generate third intermediate data by performing the affine transformation operation and the mix columns operation on the second intermediate data; and
generate the first intermediate data by performing the key addition on the third intermediate data.

12. The cryptographic device of claim 11, wherein the combined operation module is configured to generate the first intermediate data by adding a quantity to the third intermediate data, wherein the quantity is based on a sum of an affine constant and the respective round key.

13. A method of operating a cryptographic device, the method comprising:
generating an input block based on performing key addition on a plaintext block in response to a cipher key; and
generating an output block by performing a plurality of rounds of processing on the input block, including
in a first round of the rounds, initializing first intermediate data to be equal to the input block; and
for each of the rounds,
providing a round key based on the cipher key,
performing a matrix inversion operation on first intermediate data to generate second intermediate data, and
updating the first intermediate data by performing an affine transformation operation and a mix columns operation on the second intermediate data.

14. The method of claim 13, further comprising generating a ciphertext block by performing key addition in response to the output block.

15. The method of claim 14, further comprising:
generating a second block by performing an affine transformation on the output block; and
generating a third block by performing row shifting on the second block,
wherein the ciphertext block is generated by adding a last round key to the third block.

16. The method of claim 13, wherein the method is compliant with the Advanced Encryption Standard (AES).

17. The method of claim 13, wherein performing the matrix inversion operation includes performing a multiplicative inverse on each byte of the first intermediate data.

18. The method of claim 17, wherein the multiplicative inverse is performed over a Galois Field with $2^8$ elements.

19. The method of claim 13, further comprising:
transforming a group of bytes of the second intermediate data to create a group of transformed bytes; and adding a respective round constant to each byte of the group of transformed bytes to generate a respective byte of the first intermediate data.

20. The method of claim 19, wherein the respective round constants are based on a sum of a component of an affine constant and a component of the respective round key.

21. The method of claim 13, further comprising performing key addition in order to generate the first intermediate data.

22. The method of claim 21, further comprising:
generating third intermediate data by performing the affine transformation operation and the mix columns operation on the second intermediate data; and
generating the first intermediate data by performing the key addition on the third intermediate data.

23. The method of claim 22, further comprising generating the first intermediate data by adding a quantity to the third intermediate data, wherein the quantity is based on a sum of an affine constant and the respective round key.

* * * * *